US012586964B2

(12) United States Patent
Murata et al.

(10) Patent No.: US 12,586,964 B2
(45) Date of Patent: Mar. 24, 2026

(54) GROMMET AND INLET ASSEMBLY

(71) Applicant: SUMITOMO WIRING SYSTEMS, LTD., Mie (JP)

(72) Inventors: Takuya Murata, Mie (JP); Takao Suga, Mie (JP); Yoshimi Uchida, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 312 days.

(21) Appl. No.: 18/279,867

(22) PCT Filed: Mar. 2, 2022

(86) PCT No.: PCT/JP2022/008792
§ 371 (c)(1),
(2) Date: Aug. 31, 2023

(87) PCT Pub. No.: WO2022/190978
PCT Pub. Date: Sep. 15, 2022

(65) Prior Publication Data
US 2024/0162668 A1 May 16, 2024

(30) Foreign Application Priority Data

Mar. 8, 2021 (JP) ................................. 2021-036165

(51) Int. Cl.
*H01R 13/74* (2006.01)
*B60R 16/03* (2006.01)
(Continued)

(52) U.S. Cl.
CPC ............. *H01R 13/74* (2013.01); *B60R 16/03* (2013.01); *H01B 17/583* (2013.01);
(Continued)

(58) Field of Classification Search
CPC H01R 13/74; H01R 13/5227; H01R 2201/26; B60R 16/03; H01B 17/583; H02G 3/22; B60L 53/16
See application file for complete search history.

(56) References Cited

U.S. PATENT DOCUMENTS 6,162,087 A 12/2000 Hiura
2013/0078846 A1 3/2013 Sasaki et al.
(Continued)

FOREIGN PATENT DOCUMENTS

JP S63-131519 U1 8/1988
JP S63-180367 U1 11/1988
(Continued)

OTHER PUBLICATIONS

English Translation of JP-2014-053091-A1 (Year: 2014).*
International Search Report issued on Apr. 19, 2022 for WO 2022/190978 A1 (6 pages).

*Primary Examiner* — Sean Gugger
(74) *Attorney, Agent, or Firm* — Venjuris, P.C.

(57) ABSTRACT

An object is to provide technology that can reduce the thickness of an inlet assembly. A grommet includes a main body portion that covers an inlet installed in a vehicle and a wiring member extending from the inlet. The main body portion includes a connection port through which a connecting portion of the inlet to be connected to an external charging connector is inserted and an outlet port through which the wiring member is inserted. The connection port is open in a first direction, and the outlet port is open in a second direction that intersects the first direction.

10 Claims, 9 Drawing Sheets

(51) Int. Cl.
    *H01B 17/58*     (2006.01)
    *H01R 13/52*     (2006.01)
    *H02G 3/22*     (2006.01)
    *B60L 53/16*     (2019.01)

(52) U.S. Cl.
    CPC ........... *H01R 13/5227* (2013.01); *H02G 3/22* (2013.01); *B60L 53/16* (2019.02); *H01R 2201/26* (2013.01)

(56)            References Cited

U.S. PATENT DOCUMENTS

| | | | |
|---|---|---|---|
| 2015/0303614 A1 | 10/2015 | Kurita | |
| 2016/0072213 A1 | 3/2016 | Ichio et al. | |
| 2020/0303872 A1* | 9/2020 | Matsumura | .......... H01R 13/506 |

FOREIGN PATENT DOCUMENTS

| | | |
|---|---|---|
| JP | 2014-053091 A | 3/2014 |
| JP | 2020-155306 A | 9/2020 |

\* cited by examiner

GROMMET AND INLET ASSEMBLY

CROSS REFERENCE TO RELATED APPLICATIONS

This application is a national phase of PCT application No. PCT/JP2022/008792, filed on 2 Mar. 2022, which claims priority from Japanese patent application No. 2021-036165, filed on 8 Mar. 2021, all of which are incorporated herein by reference.

TECHNICAL FIELD

The present disclosure relates to a grommet and an inlet assembly.

BACKGROUND

Patent Document 1 discloses an inlet assembly that is provided in a vehicle configured to charge a power storage device mounted in the vehicle with use of an external power source. A cable included in the inlet assembly extends to the rear side of the inlet assembly from a side opposite to a connection port for connecting an external charging cable.

PRIOR ART DOCUMENT

Patent Document

Patent Document 1: JP 2011-175764 A

SUMMARY OF THE INVENTION

Problems to be Solved

In the vehicle in which the inlet assembly described in Patent Document 1 is arranged, it is necessary to secure a space for arranging the cable drawn out to the rear side of the inlet assembly.

Therefore, an object of the present disclosure is to provide technology that can reduce the thickness of an inlet assembly.

Means to Solve the Problem

A grommet according to the present disclosure includes a main body portion configured to cover an inlet installed in a vehicle and a wiring member extending from the inlet, wherein the main body portion includes a connection port through which a connecting portion of the inlet to be connected to an external charging connector is inserted and an outlet port through which the wiring member is inserted, the connection port is open in a first direction, and the outlet port is open in a second direction that intersects the first direction.

Effect of the Invention

According to the present disclosure, it is possible to reduce the thickness of an inlet assembly.

DETAILED DESCRIPTION TO EXECUTE THE INVENTION

Description of Embodiments of Present Disclosure

Figure 1:
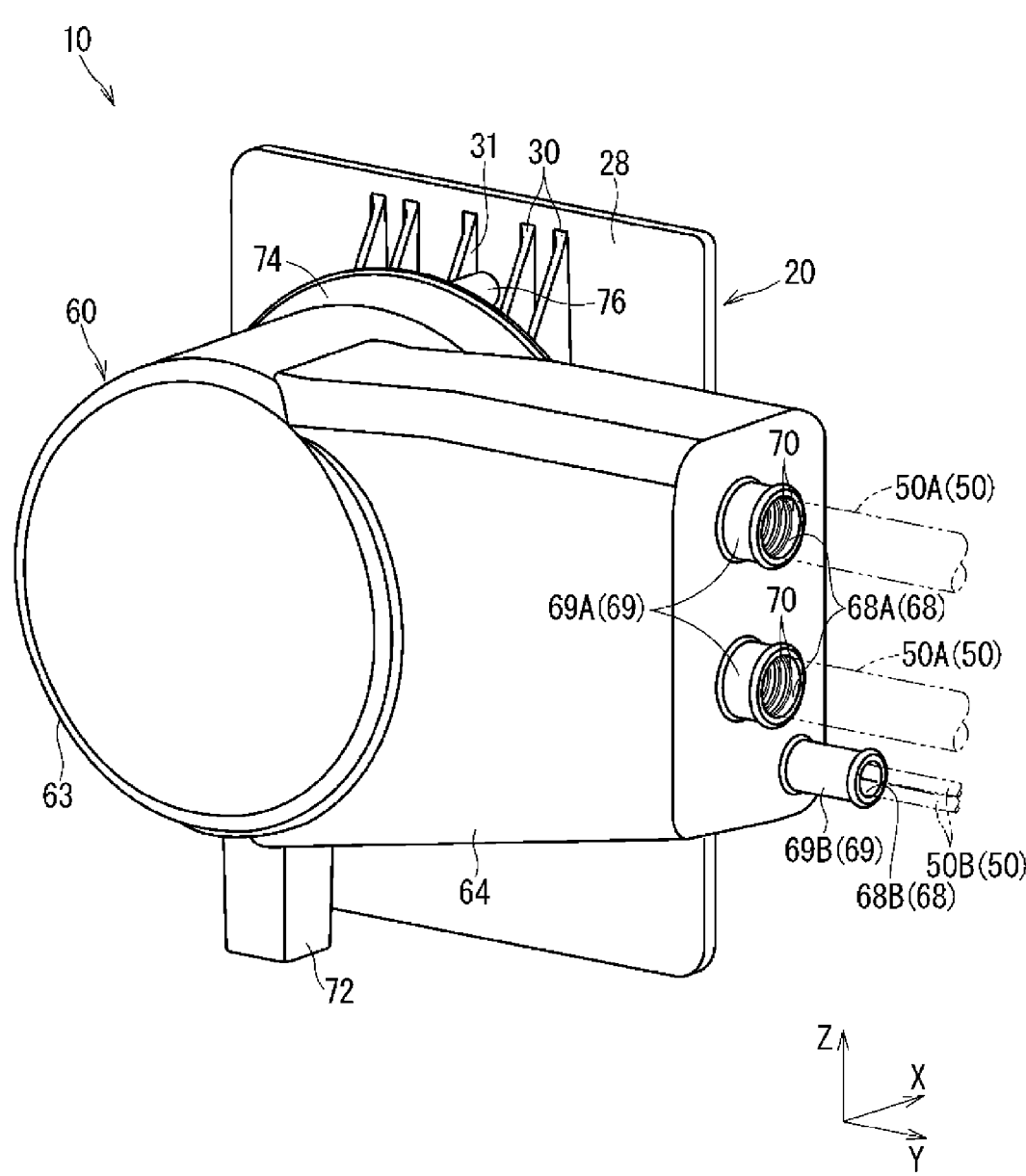
FIG. 1 is a perspective view showing a grommet and an inlet assembly including the grommet according to Embodiment 1.

First, embodiments of the present disclosure will be listed and described.

A grommet according to the present disclosure is configured as follows.

(1) A grommet including: a main body portion configured to cover an inlet installed in a vehicle and a wiring member extending from the inlet, wherein the main body portion includes a connection port through which a connecting portion of the inlet to be connected to an external charging connector is inserted and an outlet port through which the wiring member is inserted, the connection port is open in a first direction, and the outlet port is open in a second direction that intersects the first direction. The connection port through which the connecting portion of the inlet to be connected to the external charging connector is inserted and the outlet port through which the wiring member extending from the inlet is inserted are open in mutually intersecting directions. Therefore, it is possible to reduce the thickness of an inlet assembly when compared with a case where the connection port and the outlet port are open in mutually opposite directions. Also, it is possible to regulate the wiring member in such a manner as to extend from the grommet in the second direction with use of the outlet port.

(2) In the grommet described above in (1), a water drain port for discharging water that has intruded into the main body portion may be formed in the main body portion, and the water drain port may be open in a third direction that intersects the first direction and the second direction. This configuration makes it possible to discharge water that has intruded via the inlet into the inlet assembly from the grommet without the need to separately provide a water discharge member in the inlet assembly. Also, when the grommet is arranged in such a manner that the third direction is the vertically downward direction, the outlet port faces a direction that intersects the vertically downward direction, and therefore, intrusion of water into the outlet port can be suppressed.

(3) In the grommet described above in (2), a partition that overlaps the water drain port as viewed in the third direction may be provided in the main body portion, and the partition may be arranged between the water drain port and a space where the wiring member is arranged inside the main body portion. In this case, even when dust or the like enters the main body portion via the water drain port, the partition can prevent the dust or the like from attaching to a conductor in an end portion of the wiring member exposed inside the inlet assembly.

(4) In the grommet described above in (2) or (3), the main body portion may include a water drain tube portion extending in the third direction and including an internal space that serves as the water drain port. In this case, water discharged from the water drain port can be guided by the water drain tube portion. Also, dust or the like is unlikely to reach the space where the conductor is housed because the water drain tube portion is provided.

(5) In the grommet described above in any one of (1) to (4), the main body portion may include an outlet tube portion extending in the second direction and including an internal space that serves as the outlet port, and a ring-shaped lip portion capable of coming into contact with the wiring member may be provided on an inner surface of the outlet tube portion. With this configuration, it is possible to waterproof a space between the grommet and the wiring member in the outlet port.

(6) In the grommet described above in any one of (1) to (5), the main body portion may include a connection tube portion extending in the first direction and including an internal space that serves as the connection port, and a ring-shaped lip portion capable of coming into contact with an outer surface of the connecting portion may be provided on an inner surface of the connection tube portion. With this configuration, it is possible to waterproof a space between the grommet and the connecting portion around the connection port.

(7) In the grommet described above in any one of (1) to (6), a plurality of the outlet ports may be formed. In this case, a plurality of the wiring members can be drawn out separately from each other.

(8) An inlet assembly according to the present disclosure including: an inlet including a connecting portion to be connected to an external charging connector; a wiring member extending from the inlet; and the grommet described above in any one of (1) to (7) and covering the inlet and the wiring member, wherein the connecting portion extends to the outside of the grommet via the connection port, and the wiring member extends to the outside of the grommet via the outlet port. The connection port of the grommet, through which the connecting portion of the inlet to be connected to the external charging connector is inserted, and the outlet port of the grommet, through which the wiring member extending from the inlet is inserted, are open in mutually intersecting directions. Therefore, the thickness of the inlet assembly can be reduced when compared with a case where the connection port and the outlet port are open in mutually opposite directions. Also, the wiring member is regulated in such a manner as to extend from the grommet in the second direction by being inserted through the outlet port.

(9) An inlet assembly according to the present disclosure including: an inlet including a connecting portion to be connected to an external charging connector; a wiring member extending from the inlet; and the grommet described in (7) and covering the inlet and the wiring member, wherein the connecting portion extends to the outside of the grommet via the connection port, a plurality of the wiring members extend to the outside of the grommet via the outlet ports, and the plurality of outlet ports include at least one outlet port through which only one wiring member of the wiring members is inserted. The connection port of the grommet, through which the connecting portion of the inlet to be connected to the external charging connector is inserted, and the outlet ports of the grommet, through which the wiring members extending from the inlet are inserted, are open in mutually intersecting directions. Therefore, the thickness of the inlet assembly can be reduced when compared with a case where the connection port and the outlet ports are open in mutually opposite directions. Also, the wiring members are regulated in such a manner as to extend from the grommet in the second direction by being inserted through the outlet ports. Furthermore, in the outlet port through which only one wiring member is inserted, a gap is unlikely to be formed between the wiring member and the grommet.

Details of Embodiments of Present Disclosure

The following describes specific examples of a grommet and an inlet assembly according to the present disclosure with reference to the drawings. Note that the present disclosure is not limited to the following examples, but is defined by the claims, and is intended to encompass all modifications within the meanings and scope that are equivalent to the claims.

Embodiment 1

Figure 2:
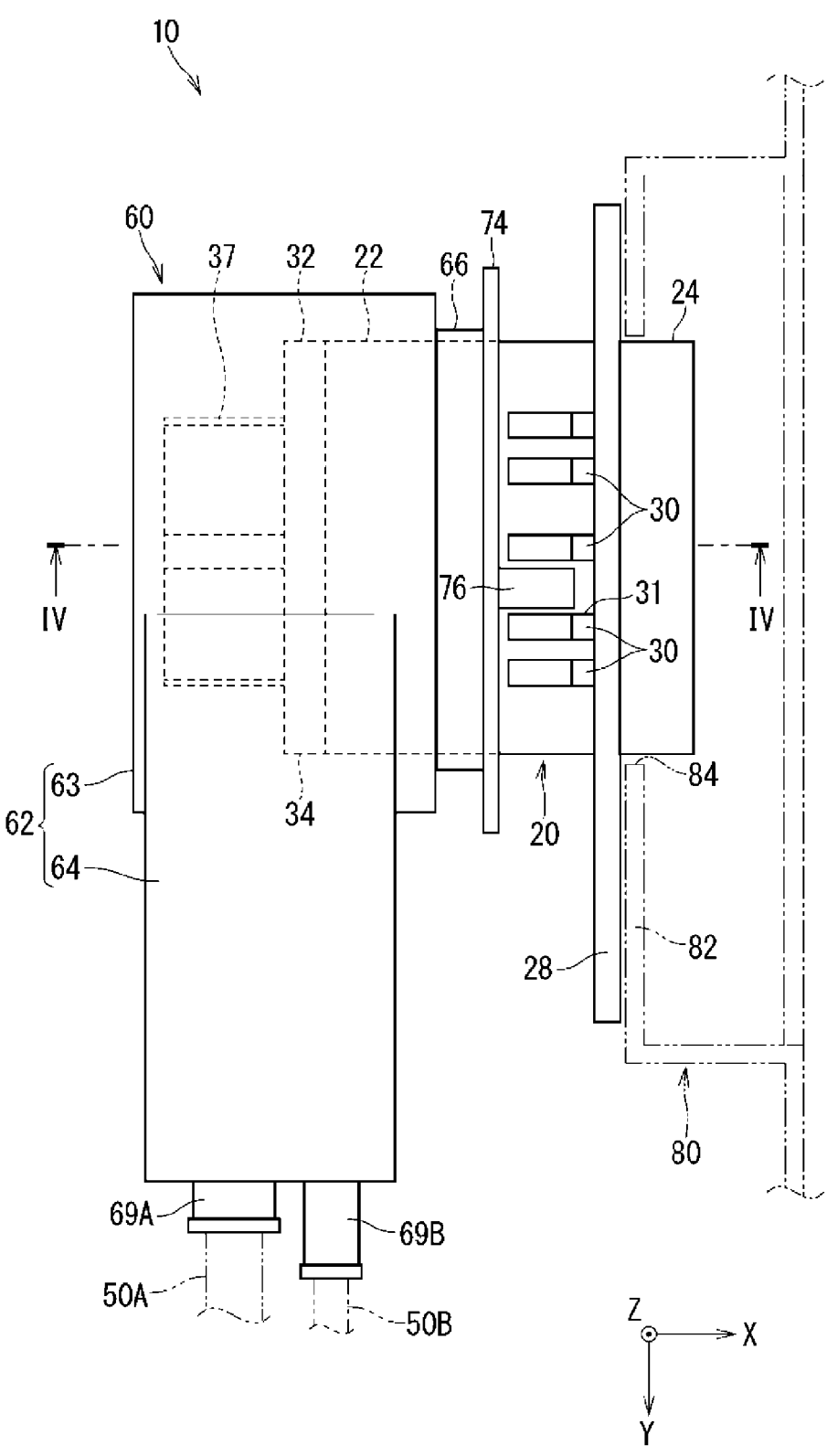
FIG. 2 is a plan view showing the inlet assembly.
Figure 3:
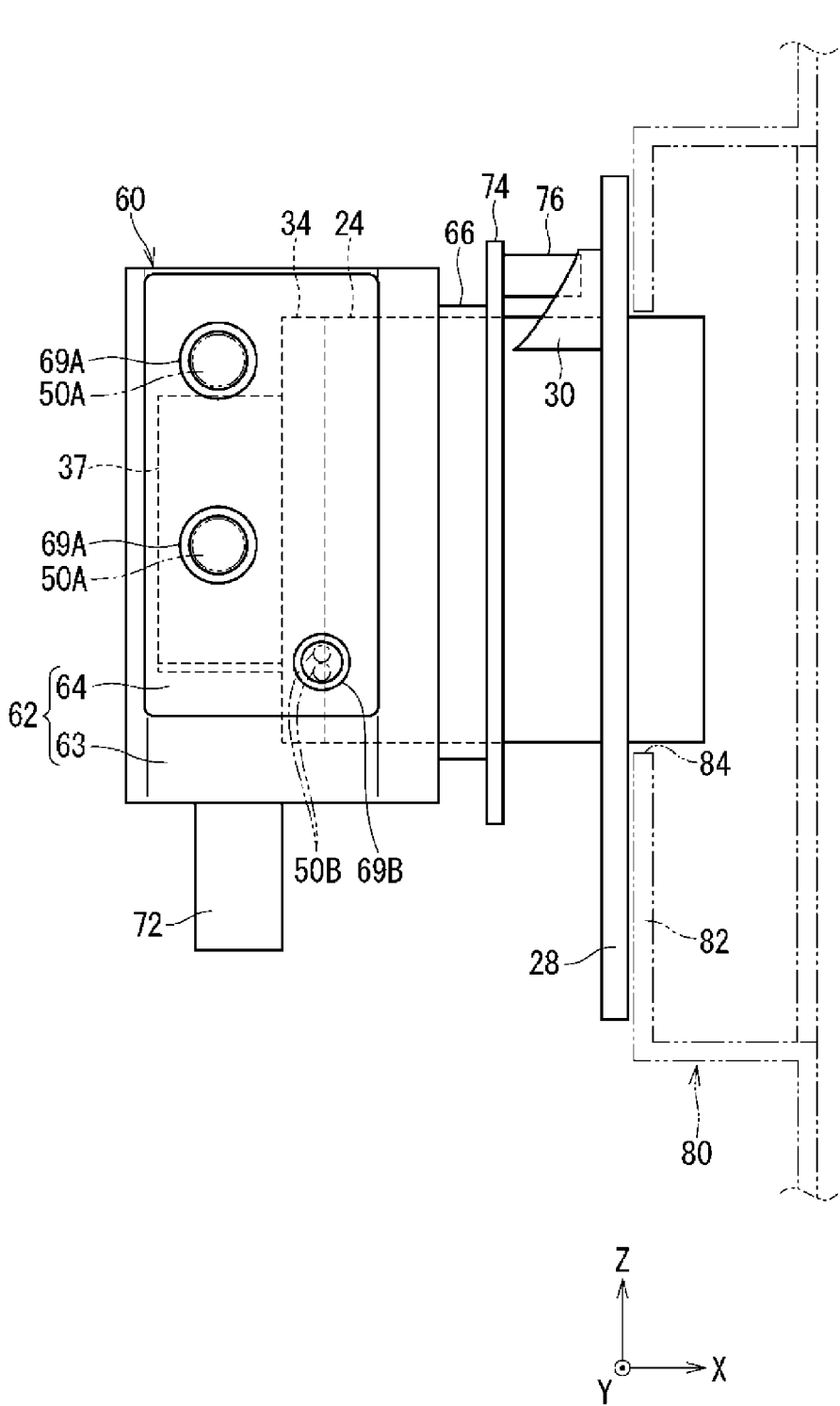
FIG. 3 is a side view showing the inlet assembly.
Figure 4:
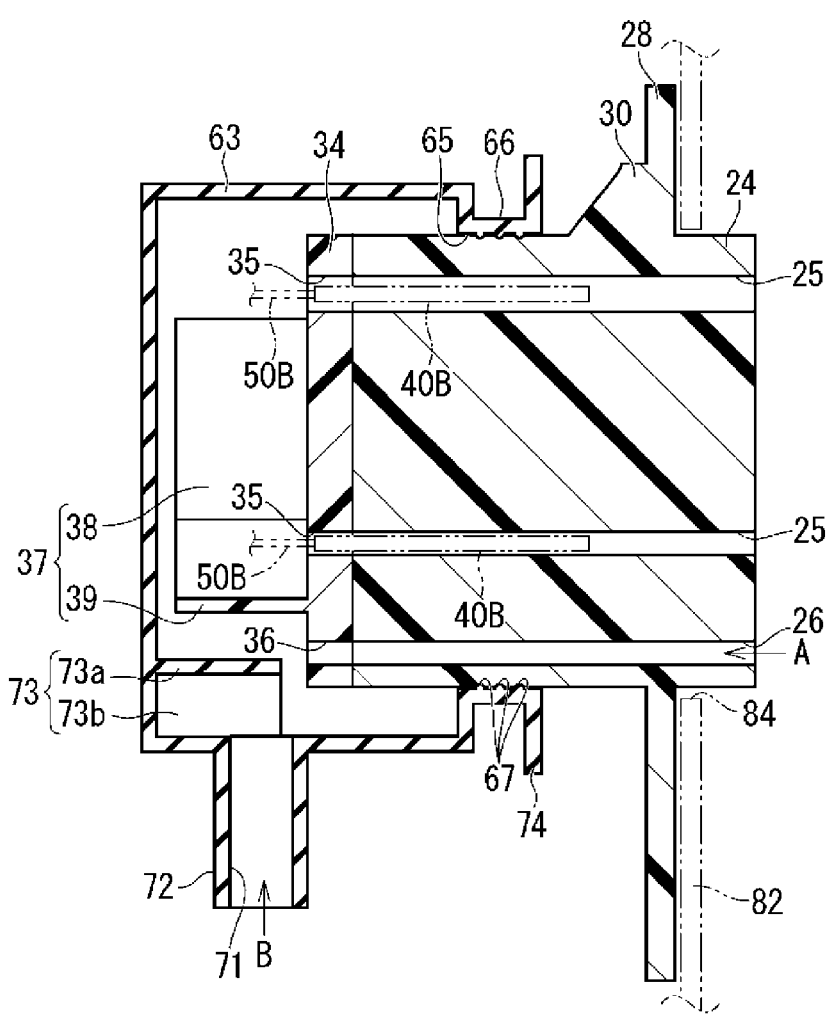
FIG. 4 is a cross-sectional view taken along the line IV-IV shown in FIG. 2.
Figure 4:
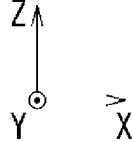

The following describes a grommet and an inlet assembly including the grommet according to Embodiment 1. FIG. 1 is a perspective view showing a grommet 60 and an inlet assembly 10 including the grommet 60 according to Embodiment 1. FIG. 2 is a plan view showing the inlet assembly 10. FIG. 3 is a side view showing the inlet assembly 10. FIG. 4 is a cross-sectional view taken along the line IV-IV shown in FIG. 2.
<Inlet Assembly>

The inlet assembly 10 is installed in a vehicle. The vehicle is an electrically driven vehicle including a power storage device and a motor. The vehicle travels by driving the motor with power stored in the power storage device. The vehicle may be an electric vehicle that includes only the motor as a driving source, or a hybrid vehicle that includes the motor and an engine. The power storage device included in the vehicle is charged with power supplied from an external charging station. The inlet assembly 10 is attached to an inlet attachment portion 80 that is provided in an outer surface of the body of the vehicle, for example. FIG. 2 shows an example of the inlet attachment portion 80. The inlet attachment portion 80 is formed as a recess in which a portion of a panel 82 constituting the body is recessed toward the vehicle interior side, for example. A through hole 84 is formed in the panel 82 constituting a bottom portion of the inlet attachment portion 80. A portion of the inlet assembly 10 is arranged on the vehicle interior side with respect to the panel 82, and another portion of the inlet assembly 10 extends through the through hole 84.

The inlet assembly 10 includes an inlet 20, wiring members 50, and a grommet 60. The inlet 20 is configured in such a manner that an external charging connector can be inserted into the inlet 20 and can be electrically connected to the inlet 20. The external charging connector is a connector of a charging cable extending from the charging station, for example. The inlet 20 includes a connecting portion configured to be connected to the external charging connector. The connecting portion includes a portion into which the external charging connector is inserted to be electrically connected thereto. A portion of the connecting portion extends through the through hole 84 of the panel 82. The wiring members 50 extend from the inlet 20. The wiring members 50 transmit power from the charging station to the power storage device included in the vehicle. The grommet 60 covers the inlet 20 and the wiring members 50. A connection port 65 and outlet ports 68 are formed in the grommet 60. The connecting portion of the inlet 20 extends through the connection port 65 to the outside of the grommet 60. The wiring members 50 extend through the outlet ports 68 to the outside of the grommet 60. The grommet 60 protects the inlet 20 and the wiring members 50 and waterproofs the inlet 20, for example, in a space on the vehicle interior side with respect to the panel 82.

In the present disclosure, out of an X direction, a Y direction, and a Z direction that are orthogonal to each other, the X direction is parallel with the direction in which the inlet 20 extends through the through hole 84 in the panel 82 as shown in FIG. 2. The inlet 20 and the external charging connector are connected to each other in the X direction. The Z direction is a vertical direction, for example. In a case where the inlet 20 is provided on a side surface of the vehicle, for example, the Y direction is a front-rear direction of the vehicle. In a case where the inlet 20 is provided on a front surface or a rear surface of the vehicle, for example, the Y direction is a width direction of the vehicle. In the following description, members that are not in an attached state will also be described with reference to directions that correspond to the X direction, the Y direction, and the Z direction when those members are in the attached state.

<Inlet and Wiring Member>

Figure 5:
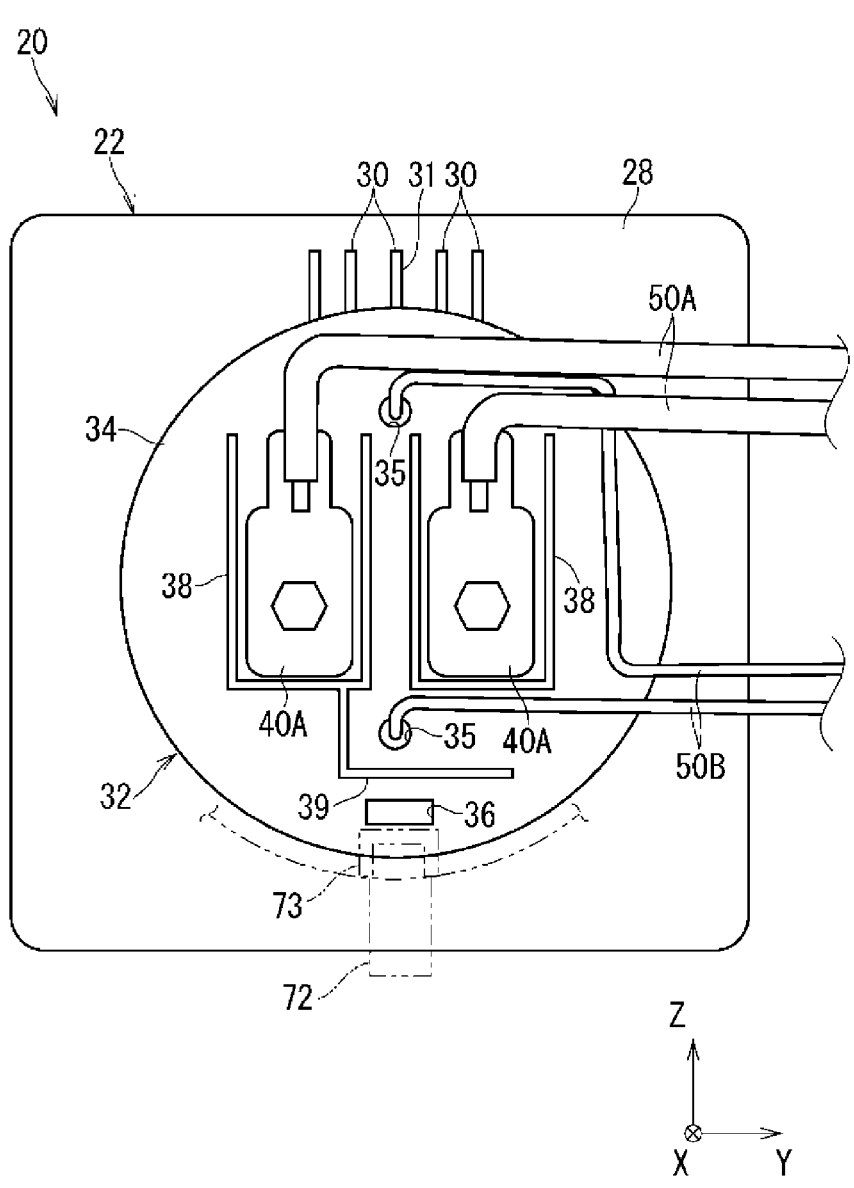
FIG. 5 is a rear view showing an inlet.
Figure 6:
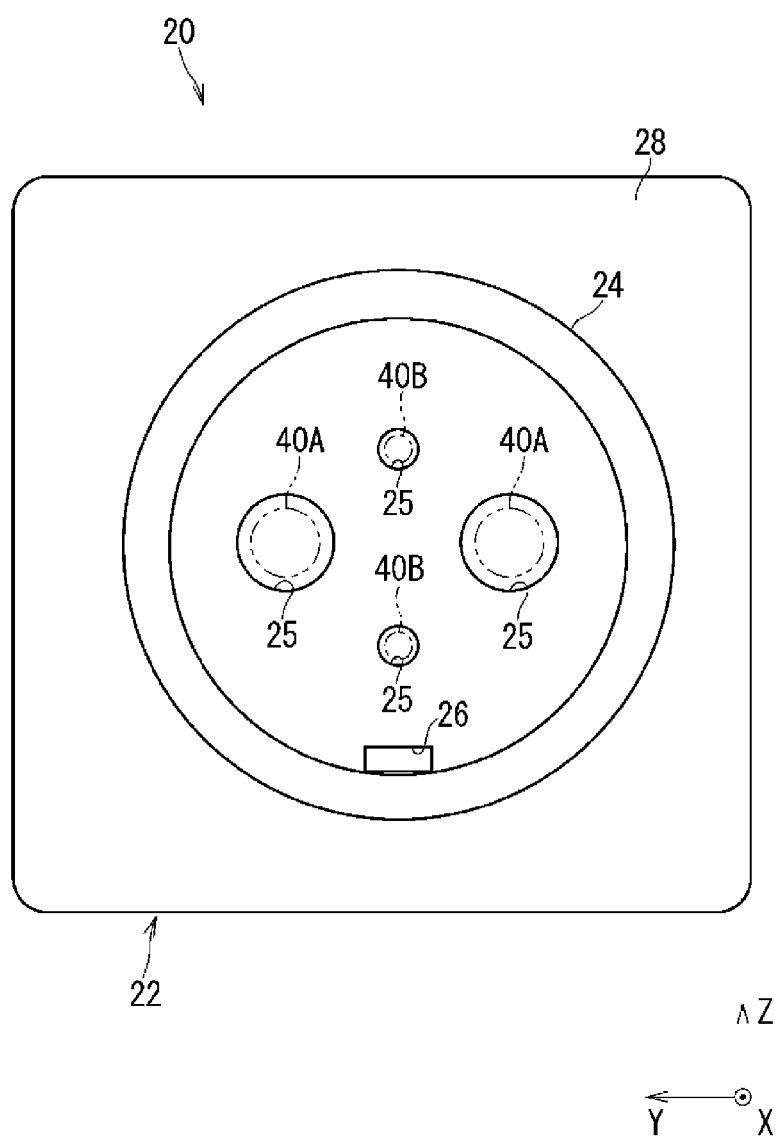
FIG. 6 is a front view showing the inlet.

The following describes the inlet 20 and the wiring members 50 with reference to FIGS. 5 and 6 in addition to FIGS. 1 to 4. FIG. 5 is a rear view showing the inlet 20 and the wiring members 50. FIG. 6 is a front view showing the inlet 20. FIG. 5 is a view from the vehicle interior side, and FIG. 6 is a view from the vehicle exterior side.

Here, the inlet 20 includes the connecting portion described above and a fixing portion 28. The fixing portion 28 is used to fix the inlet to the vehicle. Here, the connecting portion and the fixing portion of the inlet 20 are constituted by a plurality of components combined with each other. The inlet 20 includes a first member 22, a second member 32, and terminals 40 as the plurality of components.

The first member 22 includes a first housing portion 24. The first housing portion 24 extends through the through hole 84. The external shape of the first housing portion 24 preferably conforms to the shape of the through hole 84. Here, the external shape of the first housing portion 24 and the shape of the through hole 84 are circular shapes. First cavities 25 and a first water drain hole 26 each extending through the first housing portion 24 in the X direction are formed in the first housing portion 24.

The second member 32 includes a second housing portion 34. Second cavities 35 and a second water drain hole 36 each extending through the second housing portion 34 in the X direction are formed in the second housing portion 34. The first housing portion 24 and the second housing portion 34 are coupled in the X direction. The second housing portion 34 is on the vehicle interior side in the X direction with respect to the first housing portion 24. Each first cavity 25 and a corresponding second cavity 35 communicate with each other in the X direction and form a single cavity. A terminal 40 is housed in the cavity to constitute the connecting portion.

When the external charging connector is inserted into the inlet 20, end portions on one side of the terminals 40 are electrically connected to terminals included in the external charging connector. End portions on the other side of the terminals 40 are electrically connected to the wiring members 50. The terminals 40 and the wiring members 50 are kept in the connected state in the inlet 20. There is no particular limitation on the manner of connecting the terminals 40 and the wiring members 50, and the terminals 40 and the wiring members 50 may be connected by being crimped or welded, for example. Here, two terminals 40A for power supply lines and two terminals 40B for signal lines are provided as the terminals 40. Of course, the number and applications of terminals 40 are not limited to these examples. The number and applications of terminals 40 can be set as appropriate in accordance with the number and applications of terminals included in the external charging connector, for example.

The first water drain hole 26 and the second water drain hole 36 communicate with each other in the X direction and form a single water drain hole. The water drain hole prevents water from being pooled in a space outward of the panel 82 of the inlet attachment portion 80. Water pooled in the space outward of the panel 82 of the inlet attachment portion 80 is guided through the water drain hole to the space inward of the panel 82. Here, the water is guided through the water drain hole to the inside of the grommet 60. The water is discharged via a water drain port 71 of the grommet 60, which will be described later, to the outside of the grommet 60.

The first member 22 further includes the fixing portion 28 and ribs 30. The fixing portion 28 protrudes like a flange from an outer surface of the first housing portion 24 (here, the outer surface of a portion that is on the vehicle interior side with respect to the panel 82). The fixing portion 28 is larger than the through hole 84 in the panel 82. There is no particular limitation on the manner of fixing the fixing portion 28 to the panel 82, and the fixing portion 28 may be fixed to the panel 82 as described below, for example. A fixing hole is formed in the fixing portion 28. A stud bolt is provided on an inner surface of a portion of the panel 82 constituting the peripheral edge of the through hole 84. The stud bolt is fastened to the fixing hole to fix the fixing portion 28 to the panel 82. Thus, the inlet 20 (the inlet assembly 10) is attached to the inlet attachment portion 80.

The ribs 30 connect a surface of the fixing portion 28 facing the vehicle interior side and the outer surface of a side portion of the first housing portion 24. The ribs 30 reinforce the fixing portion 28. In this example, a plurality of (five in FIG. 1) ribs 30 are provided. The five ribs 30 are spaced apart from each other in the circumferential direction on the outer surface of the side portion. The five ribs 30 extend in parallel with each other. Here, the five ribs 30 are spaced apart from each other in the Y direction and each extend in parallel with the X-Z plane.

The second member 32 further includes a housing-side partition 37. The housing-side partition 37 has a plate-like shape and extends in the X direction from a rear end surface of the second housing portion 34. A leading end portion of the housing-side partition 37 in the X direction is open. The housing-side partition 37 includes two first partitions 38 serving as partitions between the terminals 40A. The housing-side partition 37 further includes a second partition 39 serving as a partition between an opening of the water drain hole and an opening of a cavity. An opening is formed in a portion of each first partition 38 in the Y-Z plane. Portions of wiring members 50A that are on another end side with respect to portions thereof connected to the terminals 40A are drawn out from the openings. Here, the openings of the first partitions 38 are open upward in the Z direction. Note that the two first partitions 38 may be open in different directions from each other. The second partition 39 is continuous to one of the first partitions 38, and accordingly, one side of the second partition 39 in the Y direction (here, the negative side in the Y direction) is closed. The second partition 39 is not continuous to the other first partition 38, and is open on the other side in the Y direction (here, the positive side in the Y direction). Here, the side on which the second partition 39 is open in the Y direction and the side toward which the wiring members 50 are drawn out are the same, but these sides may be opposite to each other.

The first member 22 is obtained by forming the first housing portion 24, the fixing portion 28, and the ribs 30 as a single piece. The second member 32 is obtained by forming the second housing portion 34 and the housing-side partition 37 as a single piece. The first member 22 and the second member 32 are each formed from a resin material having insulating properties, for example. Each of the first member 22 and the second member 32 may be formed through integral molding using the resin material, for example.

In this example, a plurality of (two in the example shown in FIG. 5) wiring members 50A that are used as power supply lines and a plurality of (two in the example shown in FIG. 5) wiring members SOB that are used as signal lines are provided as the wiring members 50. The wiring members 50A serving as the power supply lines are thicker than the wiring members SOB serving as the signal lines. Accordingly, the wiring members 50A serving as the power supply lines are more difficult to bend than the wiring members SOB serving as the signal lines. Each of the four wiring members 50 is a single coated wire including a conductor and a coating layer. The four wiring members 50 extend from the outside to the inside of the grommet 60. End portions on one side of the wiring members 50A serving as the power supply lines are connected to the terminals 40A. End portions on one side of the wiring members 50B serving as the signal lines are connected to the terminals 40B. End portions on the other side of the four wiring members 50 extend to the outside of the grommet 60 and are connected to respective connection targets. The connection targets are set in accordance with the specifications of a charging system of the vehicle. Examples of the connection targets include the power storage device, an AC-DC converter, a DC-DC converter, and an electronic control unit (ECU).

Of course, the number and applications of wiring members 50 are not limited to these examples, and can be set as appropriate in accordance with the specifications of the charging system of the vehicle. For example, a composite cable constituted by a plurality of wires covered with a single sheath may be used as a wiring member 50, and the composite cable may extend from the outside to the inside of the grommet 60. Also, the inlet assembly 10 may include a wiring member that is not connected to the external charging connector, for example. An example of such a wiring member is a wiring member that is connected to an electrical component such as a sensor embedded in the inlet 20.

<Grommet>

Figure 7:
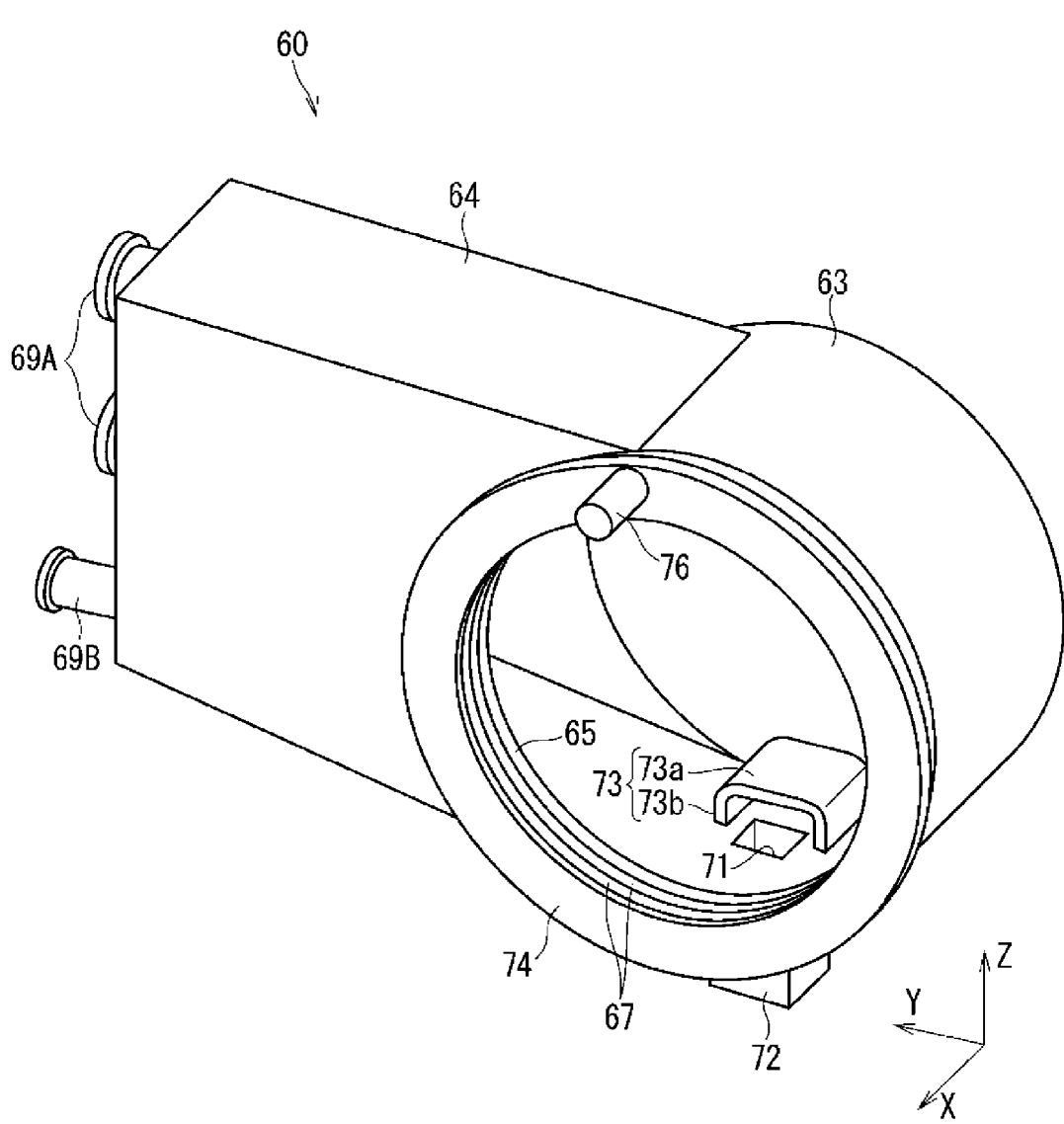
FIG. 7 is a perspective view showing the grommet.

The following describes the grommet 60 with reference to FIG. 7 in addition to FIGS. 1 to 6. FIG. 7 is a perspective view showing the grommet 60.

The grommet 60 includes a main body portion 62, a flange portion 74, and a locking portion 76. The grommet 60 is obtained by forming the main body portion 62, the flange portion 74, and the locking portion 76 as a single piece. The grommet 60 is formed from an elastic material. For example, an elastomer such as ethylene propylene diene rubber (EPDM) having high elasticity can be used as the material of the grommet 60. It is preferable that the first member 22 and the second member 32 of the inlet 20 are formed from resin materials that are harder than the elastomer. The grommet 60 may be formed through integral molding using the elastic material described above. Note that a configuration is also possible in which the grommet 60 is not provided with either one or both of the flange portion 74 and the locking portion 76.

The main body portion 62 covers the inlet 20 and the wiring members 50. The connection port 65 and the outlet ports 68 are formed in the main body portion 62. The connection port 65 is open in a first direction. The connecting portion of the inlet 20 to be connected to the external charging connector is inserted through the connection port 65. The outlet ports 68 are open in a second direction that intersects the first direction. The wiring members 50 are inserted through the outlet ports 68. Furthermore, the water drain port 71 is formed in the main body portion 62 in this example. The water drain port 71 is open in a third direction that intersects the first direction and the second direction. Water that has intruded into the main body portion 62 is discharged from the water drain port 71. The connection port 65 is larger than the outlet ports 68 and the water drain port 71.

The first direction is parallel with the X direction. In this example, the first direction, the second direction, and the third direction are orthogonal to each other. The second direction is parallel with the Y direction. The third direction is parallel with the Z direction. Note that the first direction, the second direction, and the third direction do not necessarily have to be orthogonal to each other. For example, the second direction may intersect the X direction, the Y direction, and the Z direction.

In this example, the main body portion 62 includes a first portion 63 and a second portion 64. Furthermore, in this example, the main body portion 62 includes a connection tube portion 66, outlet tube portions 69, and a water drain tube portion 72.

The first portion 63 mainly covers the connecting portion of the inlet 20. The second portion 64 mainly covers portions of the wiring members 50 that are on the other end side with respect to the portions connected to the terminals 40 and that extend in the second direction. Both the first portion 63 and the second portion 64 are hollow, and the internal space of the first portion 63 and the internal space of the second portion 64 communicate with each other. The first portion 63 is only required to be formed to be capable of covering the connecting portion of the inlet 20, and preferably has a shape that conforms to the connecting portion of the inlet 20. The second portion 64 is only required to be formed to be capable of covering the portions of the wiring members 50 extending in the second direction. The internal space of the second portion 64 is larger than a total area of the external shapes of the plurality of wiring members 50. The second portion 64 is capable of housing the plurality of wiring members 50 while keeping the wiring members 50 from coming into close contact with each other. Here, the first portion 63 has a circular cross section over its length in the first direction, and the second portion 64 has a polygonal cross section (here, a rectangular cross section) over its length in the second direction.

The connection port 65 is provided in an end portion of the first portion 63 in the X direction. An opening is not formed in the other end portion of the first portion 63 (the end portion opposite to the end portion including the connection port 65) in the first direction. In an intermediate portion of the first portion 63 in the first direction, the water drain port 71 is provided in the bottom portion of the first portion 63 in the third direction. The second portion 64 is provided on a portion of the first portion 63 other than the portion in which the water drain port 71 is provided. The second portion 64 extends in the second direction from a portion thereof continuous to the first portion 63. The outlet ports 68 are provided in a leading end portion of the second portion 64 in the second direction.

The connection tube portion 66 extends in the first direction from the end portion of the first portion 63 in the first direction. The connection tube portion 66 extends the connection port 65 in the first direction. The internal space of the connection tube portion 66 serves as the connection port 65. A lip portion 67 is provided on an inner surface of the connection tube portion 66. The lip portion 67 is formed into a ring shape so as to be capable of coming into contact with an outer surface of the connecting portion. The lip portion 67 is preferably formed in such a manner that the area inside the lip portion is smaller than the area defined by the outer surface of the connecting portion. In this case, the lip portion 67 or the connection tube portion 66 covering the connecting portion elastically deforms in such a manner as to widen the internal space, and the lip portion 67 can be pressed against the outer surface of the connecting portion. A cable tie, a crimping ring, or the like may be provided on an outer surface of the connection tube portion 66 so that the lip portion 67 is pressed against the outer surface of the connecting portion. A plurality of (here, three) lip portions 67 spaced apart from each other in the first direction are formed. Each lip portion 67 is formed over the entire circumference on the inner surface of the connection tube portion 66. A configuration is also possible in which only one lip portion 67 is provided.

The outlet tube portions 69 extend in the second direction from a leading end surface of the second portion 64 in the second direction. The outlet tube portions 69 extend the outlet ports 68 in the second direction. The internal spaces of the outlet tube portions 69 serve as the outlet ports 68. Lip portions 70 are provided on inner surfaces of the outlet tube portions 69. Each lip portion 70 is formed into a ring shape so as to be capable of coming into contact with the corresponding wiring member 50. The lip portion 70 is preferably formed in such a manner that the area inside the lip portion is smaller than the area defined by an outer surface of the wiring member 50. In this case, the lip portion 70 or the outlet tube portion 69 covering the wiring member 50 elastically deforms in such a manner as to widen the internal space, and the lip portion 70 can be pressed against the outer surface of the wiring member 50. A plurality of (here, three) lip portions 70 spaced apart from each other in the second direction are formed. Each lip portion 70 is formed over the entire circumference on the inner surface of the outlet tube portion 69. A configuration is also possible in which only one lip portion 70 is provided. The outlet tube portion 69 and the wiring member 50 may be bound together with a binding member such as an adhesive tape or a cable tie. For example, an adhesive tape may be wound around the outlet tube portion 69 and a portion of the wiring member 50 extending from the outlet tube portion 69. Alternatively, a cable tie may be wound around the outlet tube portion 69 through which the wiring member 50 extends, for example.

A plurality of (three in the example shown in FIG. 1) outlet ports 68 are formed in this example. The plurality of outlet ports 68 include at least one outlet port 68 through which only one wiring member 50 is inserted. A plurality of (three in the example shown in FIG. 1) outlet tube portions 69 are formed in correspondence with the plurality of outlet ports 68. The lip portion 70 is formed in two outlet tube portions 69A out of the three outlet tube portions 69, and the lip portion 70 is not formed in the remaining one outlet tube portion 69B. The two wiring members 50A are separately inserted through the two outlet tube portions 69A. The two wiring members 50B are collectively inserted through the one outlet tube portion 69B. The wiring members 50A are more difficult to bend than the wiring members 50B, and accordingly, positions of the outlet tube portions 69A are preferably determined in such a manner that the wiring members 50A need not be bent as far as possible. Here, the wiring members 50A extend upward in the third direction from portions thereof connected to the terminals 40A. Therefore, the two outlet tube portions 69A are provided above the outlet tube portion 69B.

The water drain tube portion 72 extends in the third direction from an outer surface of a side portion of the first portion 63. The water drain tube portion 72 extends the water drain port 71 in the third direction. The internal space of the water drain tube portion 72 serves as the water drain port 71. Here, the water drain port 71 and the water drain tube portion 72 have polygonal shapes. The water drain port 71 and the water drain tube portion 72 may also have circular shapes, for example.

A grommet-side partition 73 is provided in the main body portion 62. The grommet-side partition 73 overlaps the water drain port 71 as viewed in the third direction. The grommet-side partition 73 is arranged between the water drain port 71 and a space in which the wiring members 50 are arranged inside the main body portion 62. Here, the second partition 39 included in the housing-side partition 37 includes a portion that overlaps the water drain port 71 as viewed in the third direction. The grommet-side partition 73 is arranged between the second partition 39 and the water drain port 71.

The grommet-side partition 73 includes a partition main body 73a and a pair of leg portions 73b. The partition main body 73a overlaps the water drain port 71 as viewed in the third direction. The partition main body 73a is spaced apart from an inner surface of the side portion of the first portion 63 in the third direction. The pair of leg portions 73b connect the partition main body 73a and the side portion of the first portion 63. The pair of leg portions 73b are spaced apart from each other in the second direction. The water drain port 71 is provided between the pair of leg portions 73b in the second direction. The partition main body 73a and the pair of leg portions 73b continuously extend in the first direction to an end surface of the first portion 63 (the end surface opposite to the end surface including the connection port 65).

The partition main body 73a does not overlap the water drain port 71 as viewed in the third direction on the connecting portion side in the first direction. This configuration makes it easy for water to reach the water drain port 71 from the opening of the water drain hole in the inlet 20. Note that the partition main body 73a may overlap the entire water drain port 71 as viewed in the third direction.

The second partition 39 included in the housing-side partition 37 includes the portion that overlaps the water drain port 71 as viewed in the third direction on the connecting portion side in the first direction. That is, the second partition 39 included in the housing-side partition 37 is provided in a portion where the grommet-side partition 73 is not provided as viewed in the third direction. Accordingly, the second partition 39 included in the housing-side partition 37 prevents dust or the like from entering the space where the terminals 40 are housed through the portion where the grommet-side partition 73 is not provided. The second partition 39 extends to a position where the second partition 39 overlaps the partition main body 73a in the first direction. The second partition 39 overlaps the entire water drain port 71 in the first direction. The second partition 39 extends past the water drain port 71 in the first direction.

The flange portion 74 is provided around a portion of the connection tube portion 66 that is on the leading end side with respect to an intermediate portion thereof in the first direction. That is, the flange portion 74 is spaced apart from the first portion 63. Here, the flange portion 74 is provided around a leading end portion of the connection tube portion 66 in the first direction. The flange portion 74 has a ring shape and is provided on the side surface of the connection tube portion 66 over the entire circumference thereof. However, the flange portion 74 does not necessarily have to have the ring shape and be provided over the entire circumference on the side surface of the connection tube portion 66, and may be provided in a portion of the side surface of the connection tube portion 66.

The locking portion 76 is locked with a to-be-locked portion 31 provided in the inlet 20. The locking portion 76 and the to-be-locked portion 31 are locked in a circumferential direction around a rotation axis of the inlet 20 and the main body portion 62. The inlet 20 and the grommet 60 are kept from rotating around the connection port 65 because the locking portion 76 and the to-be-locked portion 31 are locked. Here, a recessed portion 31 between a pair of adjacent ribs 30 included in the inlet 20 serves as the to-be-locked portion 31. The pair of adjacent ribs 30 are spaced apart from each other in a direction (here, the Y direction) that intersects the X direction and extend from the fixing portion 28 in parallel with the X direction. The space between leading ends of the pair of ribs 30 is open in the X direction, and this space is taken as the recessed portion 31 recessed in the X direction. The locking portion 76 includes a protrusion 76 that can be fitted in the recessed portion 31. The protrusion 76 protrudes in the X direction from an end surface in the X direction of a portion of the main body portion 62 constituting the peripheral edge of the connection port 65. The size of the protrusion 76 may be the same as or smaller than the size of the recessed portion 31. Here, the protrusion 76 is slightly smaller than the recessed portion 31. The protrusion 76 may be larger than the recessed portion 31 as long as the protrusion 76 can be fitted in the recessed portion 31 by elastically deforming. The protrusion 76 may have the same cross section at any point in the X direction. Alternatively, the protrusion 76 may be tapered toward the leading end side in the X direction.

Here, the locking portion 76 is provided on the flange portion 74. The protrusion 76 protrudes from the flange portion 74 toward the side opposite to the first portion 63 in the X direction. Here, the locking portion 76 and the water drain port 71 are provided on mutually opposite sides in the third direction with respect to the center of the connection port 65. The locking portion 76 is on the upper side in the third direction with respect to the center of the connection port 65. The water drain port 71 is on the lower side in the third direction with respect to the center of the connection port 65.

<Effects>

In the grommet 60 and the inlet assembly 10 including the grommet 60 configured as described above, the connection port 65 of the grommet 60, through which the connecting portion of the inlet 20 to be connected to the external charging connector is inserted, and the outlet ports 68 of the grommet 60, through which the wiring members 50 extending from the inlet 20 are inserted, are open in mutually intersecting directions. Therefore, it is possible to reduce the thickness of the inlet assembly 10 when compared with a case where the connection port 65 and the outlet ports 68 are open in mutually opposite directions. Also, the wiring members 50 are regulated in such a manner as to extend from the grommet 60 in the second direction by being inserted through the outlet ports 68.

Also, the water drain port 71 for discharging water that has intruded into the main body portion 62 is formed in the main body portion 62, and the water drain port 71 is open in the third direction that intersects the first direction and second direction. Therefore, water that has intruded via the inlet 20 into the inlet assembly 10 (water that has intruded in the direction of the arrow A shown in FIG. 4) can be discharged from the grommet 60 without the need to separately provide a water discharge member in the inlet assembly 10. Also, when the grommet 60 is arranged in such a manner that the third direction is the vertically downward direction, the outlet ports 68 face a direction that intersects the vertically downward direction, and therefore, intrusion of water into the outlet ports 68 is suppressed.

A partition that overlaps the water drain port 71 as viewed in the third direction is provided in the main body portion 62, and the partition is arranged between the water drain port 71 and a space where the wiring members 50 are arranged inside the main body portion 62. Therefore, even when dust or the like enters the main body portion 62 via the water drain port 71 in the direction of the arrow B shown in FIG. 4, the partition can prevent the dust or the like from attaching to the conductors in end portions of the wiring members 50 exposed inside the inlet assembly 10.

The main body portion 62 includes the water drain tube portion 72 extending in the third direction and including the internal space that serves as the water drain port 71. Therefore, water discharged from the water drain port 71 can be guided by the water drain tube portion 72. Also, even when dust or the like enters the water drain port 71, the dust or the like is unlikely to reach the space where the conductors are housed because the water drain tube portion 72 is provided.

The main body portion 62 includes the outlet tube portions 69 extending in the second direction and including internal spaces that serve as the outlet ports 68, and the ring-shaped lip portions 70 capable of coming into contact with the wiring members 50 are provided on the inner surfaces of the outlet tube portions 69. With this configuration, it is possible to waterproof a space between the grommet 60 and the wiring members 50 in the outlet ports 68.

The main body portion 62 includes the connection tube portion 66 extending in the first direction and including the internal space that serves as the connection port 65, and the ring-shaped lip portion 67 capable of coming into contact with the outer surface of the connecting portion is provided on the inner surface of the connection tube portion 66. With this configuration, it is possible to waterproof a space between the grommet 60 and the connecting portion around the connection port 65.

The plurality of outlet ports 68 are formed. Therefore, the wiring members 50 can be drawn out separately from each other. The plurality of outlet ports 68 include at least one outlet port 68 through which only one wiring member 50 is inserted. Therefore, in the outlet port 68 through which only one wiring member 50 is inserted, a gap is unlikely to be formed between the wiring member 50 and the grommet 60.

[Variations]

Figure 8:
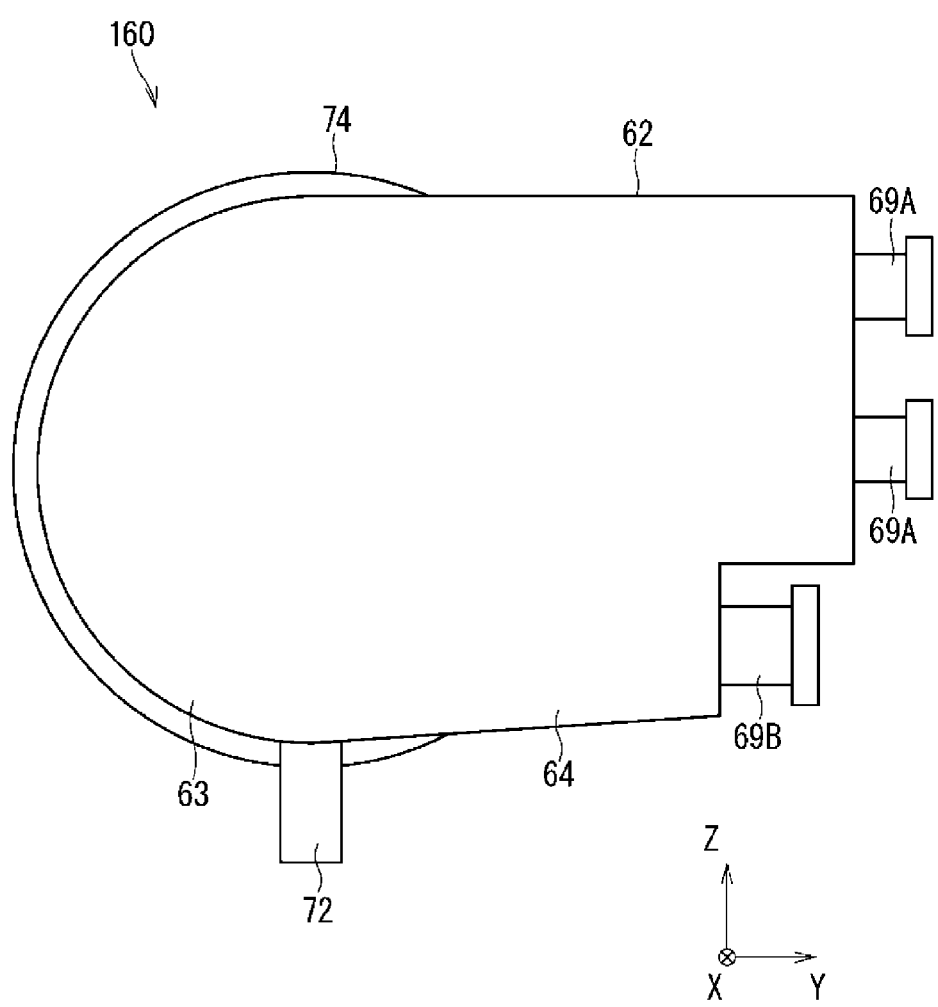
FIG. 8 is a rear view showing a first variation of the grommet.

FIG. 8 is a rear view showing a first variation of the grommet 60.

In the example described above, all of the plurality of outlet ports 68 are provided in the same surface of the second portion 64, but this is not an essential configuration. As in a grommet 160 shown in FIG. 8, some outlet ports 68 may be provided in a surface of the second portion 64 that is different from a surface of the second portion 64 in which another outlet port 68 is provided. In the grommet 160 shown in FIG. 8, the surface including some outlet ports 68 is spaced farther away from the center of the first portion 63 in the second direction than the surface including the other outlet port 68. In the grommet 160 shown in FIG. 8, the outlet ports 68A, through which the wiring members 50A used as power supply lines extend, is spaced farther away from the center of the first portion 63 in the second direction than the outlet port 68B, through which the wiring members 50B used as signal lines extend. A configuration is also possible in which the outlet port 68B, through which the wiring members 50B used as signal lines extend, is spaced farther away from the center of the first portion 63 in the second direction than the outlet ports 68A, through which the wiring members 50A used as power supply lines extend.

Figure 9:
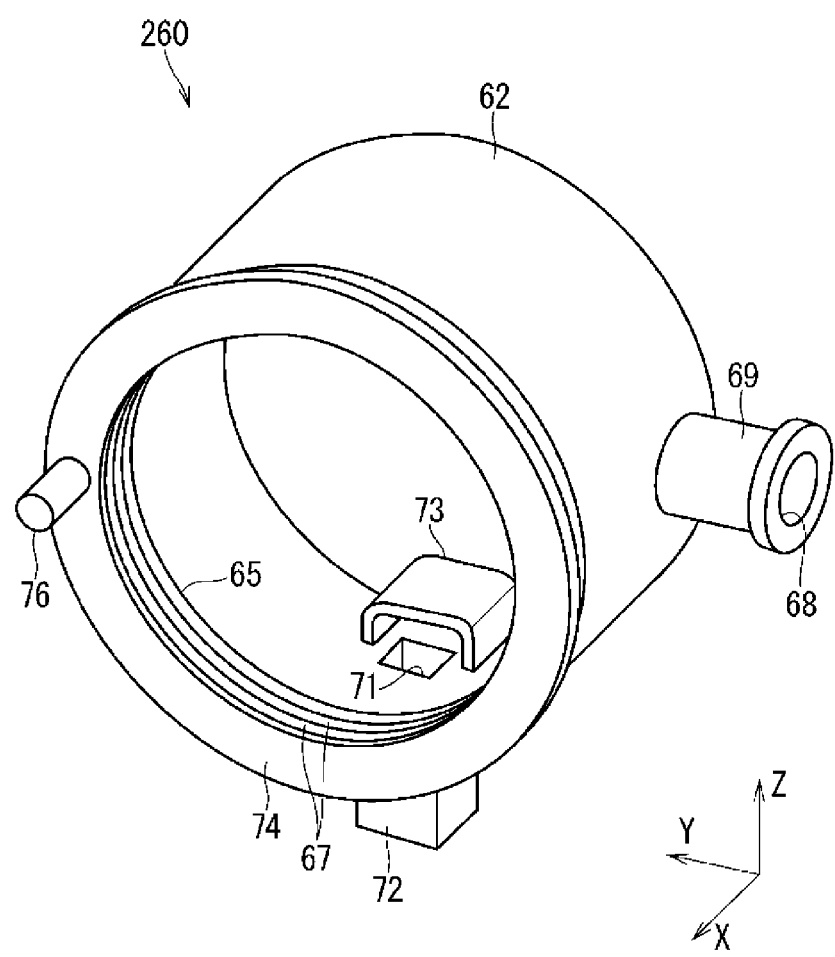
FIG. 9 is a perspective view showing a second variation of the grommet.

FIG. 9 is a perspective view showing a second variation of the grommet 60.

In the example described above, the main body portion 62 includes the second portion 64, but this is not an essential configuration. A configuration is also possible in which the main body portion 62 does not include the second portion 64 as in a grommet 260 shown in FIG. 9.

Also, in the example described above, a plurality of outlet ports 68 are provided, but this is not an essential configuration. A configuration is also possible in which only one outlet port 68 is provided as in the grommet 260 shown in FIG. 9. In this case, a plurality of wiring members 50 may extend from the grommet 260, and the plurality of wiring members 50 may be collectively inserted through the single outlet port 68. Alternatively, a configuration is also possible in which only one wiring member 50 extends from the grommet 260.

In the example described above, the outlet ports 68 are open on the positive side in the Y direction, but this is not an essential configuration. As in the grommet 260 shown in FIG. 9, the outlet port 68 may be open on the negative side in the Y direction.

In the example described above, the locking portion 76 and the water drain port 71 are provided on mutually opposite sides in the third direction with respect to the connection port 65, but this is not an essential configuration. The locking portion 76 may be formed on the water drain port 71 side with respect to the center of the connection port 65 as in the grommet 260 shown in FIG. 9.

In the example described above, the water drain port 71 is formed in the main body portion 62, but this is not an essential configuration. A configuration is also possible in which the water drain port 71 is not formed in the main body portion 62.

In the example described above, the grommet-side partition 73 is provided in the main body portion 62, but this is not an essential configuration. A configuration is also possible in which the grommet-side partition 73 is not provided in the main body portion 62. Also, the grommet-side partition 73 does not necessarily have to be provided in the first portion 63. For example, the grommet-side partition 73 may be provided in the water drain tube portion 72.

In the example described above, the water drain tube portion 72 is provided in the main body portion 62, but this is not an essential configuration. A configuration is also possible in which the water drain tube portion 72 is not provided in the main body portion 62, and the water drain port 71 is provided in the first portion 63.

In the example described above, the connection tube portion 66 is provided in the main body portion 62, but this is not an essential configuration. A configuration is also possible in which the connection tube portion 66 is not provided in the main body portion 62, and only the connection port 65 is provided in the first portion 63. Also, a configuration is also possible in which the lip portion 67 is not provided in the connection tube portion 66.

In the example described above, the outlet tube portions 69 are provided in the main body portion 62, but this is not an essential configuration. A configuration is also possible in which the outlet tube portions 69 are not provided in the main body portion 62, and only the outlet ports 68 are provided in the first portion 63 or the second portion 64. Also, a configuration is also possible in which the lip portion 70 is not provided in the outlet tube portions 69.

The configurations described in the embodiment and the variations described above can be combined as appropriate as long as no contradiction arises.

LIST OF REFERENCE NUMERALS

10 Inlet assembly
20 Inlet
22 First member
24 First housing portion
25 First cavity
26 First water drain hole
28 Fixing portion
30 Rib
31 Recessed portion (to-be-locked portion)
32 Second member
34 Second housing portion
35 Second cavity
36 Second water drain hole
37 Housing-side partition
38 First partition
39 Second partition
40, 40A, 40B Terminal
50, 50A, 50B Wiring member
60, 160, 260 Grommet
62 Main body portion
63 First portion
64 Second portion
65 Connection port
66 Connection tube portion
67 Lip portion
68 Outlet port
69, 69A, 69B Outlet tube portion
70 Lip portion
71 Water drain port
72 Water drain tube portion
73 Grommet-side partition
73a Partition main body
73b Leg portion
74 Flange portion
76 Protrusion (locking portion)
80 Inlet attachment portion
82 Panel
84 Through hole

What is claimed is:
1. A grommet comprising:
a main body portion configured to cover an inlet installed in a vehicle and at least one wiring member extending from the inlet,
wherein
a connecting portion of the inlet is configured to be connected to an external charging connector, and
the main body portion includes
a connection tube portion extending in a first direction and including an internal space that serves as a connection port through which the connecting portion is inserted, the connection port being open in the first direction;

a lip portion having an annular shape and being formed on an inner surface of the connection tube portion, the lip portion configured to come into contact with an outer surface of the connecting portion when the main body portion covers the inlet; and at least one outlet port through which the at least one wiring member is inserted, the at least one outlet port being open in a second direction that intersects the first direction.

2. The grommet according to claim 1, wherein the main body portion further includes a water drain port for discharging water that has intruded into the main body portion, and the water drain port is open in a third direction that intersects the first direction and the second direction.

3. The grommet according to claim 2, wherein the main body portion further includes a partition that overlaps the water drain port as viewed in the third direction, and the partition is arranged between the water drain port and a space where the at least one wiring member is arranged inside the main body portion.

4. The grommet according to claim 2, wherein the main body portion further includes a water drain tube portion extending in the third direction and including an internal space that serves as the water drain port.

5. The grommet according to claim 1, wherein the main body portion further includes an outlet tube portion extending in the second direction and including an internal space that serves as the at least one outlet port, and a ring-shaped lip portion capable of coming into contact with the at least one wiring member is provided on an inner surface of the outlet tube portion.

6. The grommet according to claim 1, wherein the lip portion is formed such that an area encompassed by the lip portion is smaller than an area defined by the outer surface of the connecting portion, and the lip portion includes at least one lip formed over an entire circumference on the inner surface of the connection tube portion.

7. The grommet according to claim 1, wherein the at least one outlet port includes a plurality of outlet ports, and the at least one wiring member includes a plurality of wiring members.

8. An inlet assembly comprising:

the grommet according to claim 1, wherein the connecting portion extends to the outside of the grommet via the connection port, and the at least one wiring member extends to the outside of the grommet via the at least one outlet port.

9. An inlet assembly comprising:

the grommet according to claim 7, wherein the connecting portion extends to the outside of the grommet via the connection port, the plurality of wiring members extend to the outside of the grommet via the plurality of outlet ports, and the plurality of outlet ports include at least one outlet port through which only one wiring member of the plurality of wiring members is inserted.

10. The grommet according to claim 6, wherein the at least one lip includes a plurality of lips spaced apart from each other in the first direction.

* * * * *